United States Patent
Winkler et al.

(10) Patent No.: US 8,640,547 B2
(45) Date of Patent: Feb. 4, 2014

(54) PRESSURE SENSOR WITH A FLEXIBLE MEMBRANE

(75) Inventors: Yves Winkler, Schmitten (CH); Frédéric Meylan, Neuchâtel (CH); Joachim Grupp, Enges (CH)

(73) Assignee: The Swatch Group Research and Development Ltd, Marin (CH)

(*) Notice: Subject to any disclaimer, the term of this patent is extended or adjusted under 35 U.S.C. 154(b) by 316 days.

(21) Appl. No.: 12/990,191

(22) PCT Filed: Apr. 20, 2009

(86) PCT No.: PCT/EP2009/054677
§ 371 (c)(1),
(2), (4) Date: Oct. 28, 2010

(87) PCT Pub. No.: WO2009/132983
PCT Pub. Date: Nov. 5, 2009

(65) Prior Publication Data
US 2011/0056301 A1 Mar. 10, 2011

(30) Foreign Application Priority Data
Apr. 29, 2008 (EP) .................................. 08155390

(51) Int. Cl.
*G01L 7/00* (2006.01)
*G01L 7/08* (2006.01)
*H01G 7/00* (2006.01)

(52) U.S. Cl.
USPC .......................... 73/714; 73/715; 361/283.4

(58) Field of Classification Search
None
See application file for complete search history.

(56) References Cited

U.S. PATENT DOCUMENTS

| | | | | |
|---|---|---|---|---|
| 3,635,089 | A * | 1/1972 | Harding et al. | 73/706 |
| 4,776,218 | A | 10/1988 | Sawa et al. | |
| 5,597,957 | A * | 1/1997 | Schieferdecker et al. | 73/755 |
| 5,600,070 | A * | 2/1997 | Wlodarczyk | 73/715 |
| 5,705,751 | A * | 1/1998 | Briefer et al. | 73/722 |
| 5,798,462 | A * | 8/1998 | Briefer et al. | 73/722 |
| 7,284,439 | B2 * | 10/2007 | Jonsson | 73/724 |
| 7,814,798 | B2 * | 10/2010 | Filippi et al. | 73/715 |
| 8,141,429 | B2 * | 3/2012 | Guo | 73/718 |
| 2006/0037361 | A1 | 2/2006 | Johnson et al. | |
| 2009/0185451 | A1 | 7/2009 | Rochat | |

FOREIGN PATENT DOCUMENTS

EP    1 850 194    10/2007

OTHER PUBLICATIONS

International Search Report issued in corresponding application No. PCT/EP2009/054677, completed Jul. 28, 2009 and mailed Aug. 5, 2009.

\* cited by examiner

*Primary Examiner* — Lisa Caputo
*Assistant Examiner* — Jermaine Jenkins
(74) *Attorney, Agent, or Firm* — Griffin & Szipl, P.C.

(57) ABSTRACT

The invention relates to a pressure sensor (6). This pressure sensor (6) comprises a flexible membrane (11) cooperating with a transmission device (10) that enables a value representing the pressure to be supplied on the basis of the deformation of the membrane (11). The membrane (11) is made from an at least partially amorphous material in order to optimise the dimensions of the sensor (6).

16 Claims, 3 Drawing Sheets

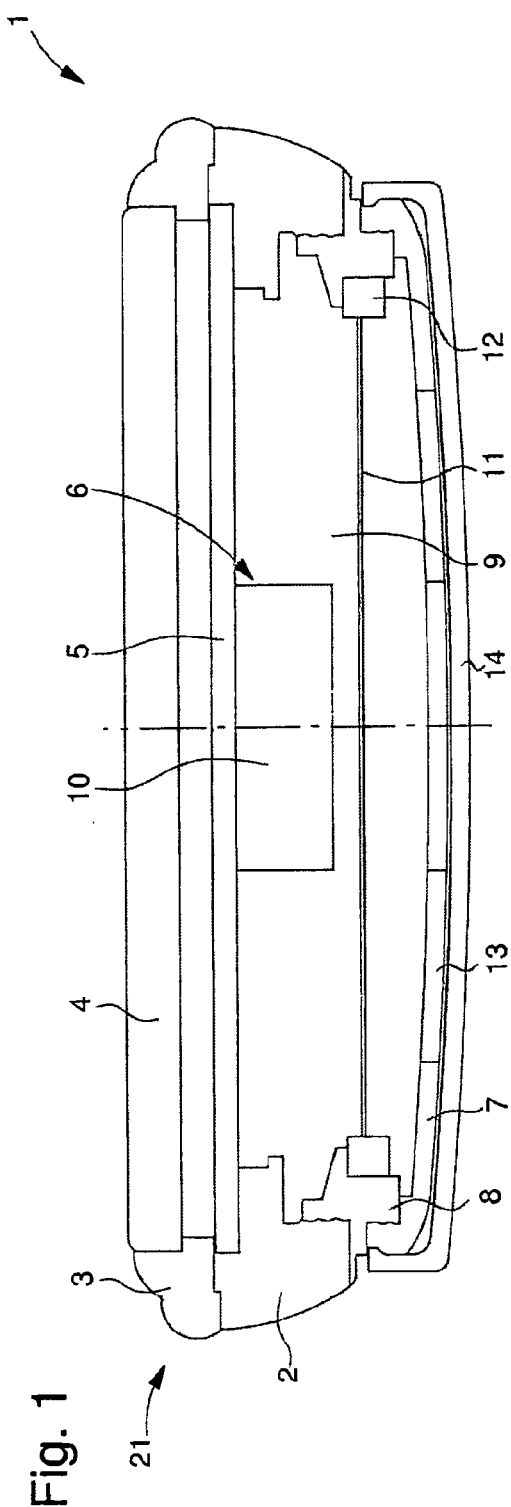
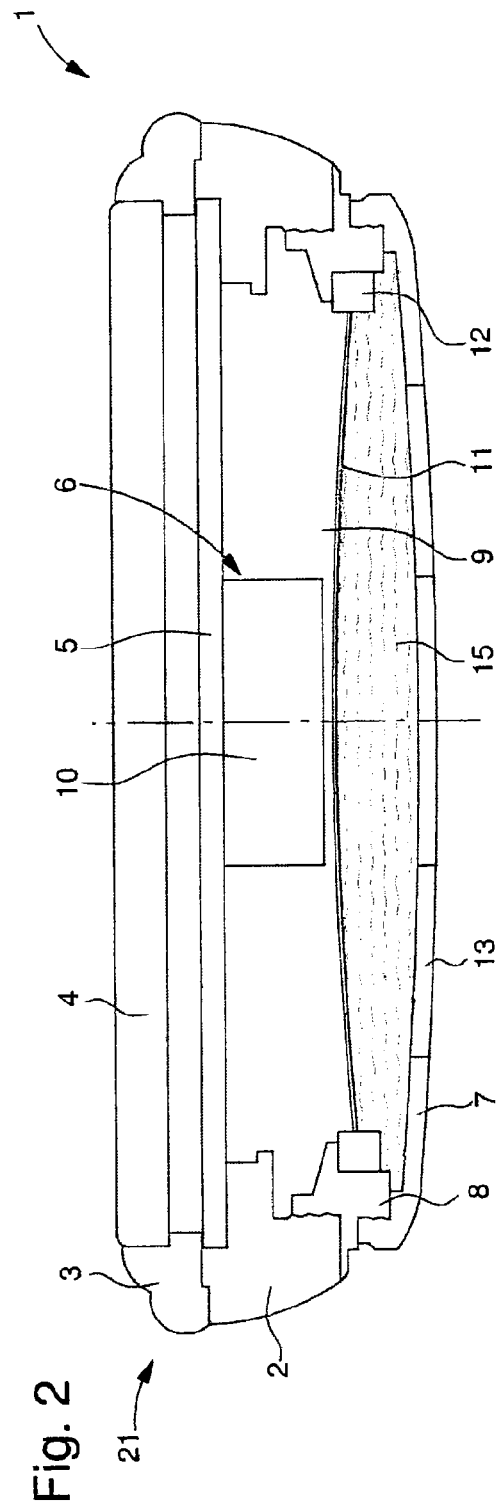

PRESSURE SENSOR WITH A FLEXIBLE MEMBRANE

This is a National Phase Application in the United States of International Patent Application PCT/EP2009/054677 filed Apr. 20, 2009, which claims priority on European Patent Application No. 08155390.1 of Apr. 29, 2008. The entire disclosures of the above patent applications are hereby incorporated by reference.

The present invention relates to a pressure sensor using a flexible membrane. This membrane cooperates with a transmission device that enables a value representing the pressure to be supplied on the basis of the deformation of said membrane.

TECHNOLOGICAL BACKGROUND

A dive watch is known in the prior art that comprises a case, which bears a pressure sensor comprising a membrane and a transmission device. The membrane is capable of deforming mechanically under the effect of external pressure to then act on the transmission device. This device thus transmits said deformation movement representing the pressure in order to be amplified, for example, so that the pressure value detected by the sensor is displayed.

In general, the membrane of this sensor is made from crystalline material such as e.g. an alloy composed of copper and beryllium (Cu—Be).

Every material is characterised by its Young's modulus E, also called elasticity modulus (generally expressed in GPa), which characterises its resistance to deformation. Moreover, every material is also characterised by its elastic limit $\sigma_e$ (generally expressed in GPa), which represents the stress beyond which the material will plastically deform. Thus, it is possible, for a given thickness, to compare materials by establishing for each one the ratio of their elastic limit to their Young's modulus $\sigma_e/E$, wherein said ratio is representative of the elastic deformation of each material. Therefore, the higher this ratio is, the greater the elastic deformation of the material. Crystalline materials such as those used in the prior art, e.g. the alloy Cu—Be, which has a Young's modulus E equal to 130 GPa and an elastic limit $\sigma_e$ that typically amounts to 1 GPa, give a low $\sigma_e/E$ ratio, i.e. in the order of 0.007. These crystalline alloy membranes therefore have a limited elastic deformation. In the case of the membrane of a pressure sensor, this means a limited measurement range.

Moreover, because this elastic limit is low, when it deforms the membrane approaches its region of plastic deformation under low stresses with the risk that it cannot resume its initial form. To avoid such a deformation, the deformation of the membrane is restricted, i.e. the amplitude of the movement of the membrane is intentionally limited. It is then understood that the transmission movement must be amplified. This results in noise that is detrimental to the pressure sensor and, moreover, to the display of the pressure value.

In addition, the use of precious crystalline metals for the production of such a pressure sensor membrane, or any other active element of a timepiece, is not conceivable considering the inadequate mechanical characteristics of these metals. In fact, these precious metals in particular have a low elastic limit in the order of 0.5 GPa in the case of alloys of Au, Pt, Pd and Ag, as opposed to about 1 GPA in the case of the crystalline alloys classically used in the production of pressure membranes. In view of the elasticity modulus of these precious metals, which is in the order of 120 GPa, a $\sigma_e/E$ ratio of about 0.004 is obtained. However, a high $\sigma_e/E$ ratio is necessary for the production of such a membrane, as explained above.

Consequently, the person skilled in the art is not encouraged to use these precious metals for the production of such a membrane.

SUMMARY OF THE INVENTION

The invention relates to a pressure sensor that remedies the abovementioned disadvantages of the prior art by proposing a more reliable membrane that has a safety margin in relation to the maximum stress applied, while also allowing a more significant deformation amplitude. Alternatively, the invention proposes a membrane that allows an equivalent deformation amplitude for smaller dimensions.

On this basis, the invention relates to the pressure sensor described above, in which the membrane is made from an at least partially amorphous metal alloy in order to optimise the dimensions of said sensor and characterised in that the metal alloy comprises at least one precious type element or one of these alloys included in the list comprising gold, platinum, palladium, rhenium, ruthenium, rhodium, silver, iridium or osmium.

Advantageous embodiments of this sensor are disclosed in dependent claims 2 to 8.

Surprisingly, precious metals in amorphous form have a high $\sigma_e/E$ ratio that allows the production of parts such as the membrane according to the invention.

A first advantage of the membrane according to the present invention is that it has elastic characteristics that are of greater interest. In fact, in the case of an amorphous material, the $\sigma_e/E$ ratio is increased by increase of the elastic limit $\sigma_e$. Thus, the stress, above which the material does not resume its initial form, is increased. This improvement in the $\sigma_e/E$ ratio thus allows a more significant deformation. This enables the dimensions of the membrane to be optimised, depending on whether the range of measurement of the membrane is to be increased or the size of said membrane is to be reduced for an equivalent range of measurement.

Another advantage of these amorphous materials is that they open up new possibilities for shaping to allow the design of parts with complicated shapes with a much higher precision. In fact, amorphous metals have the particular characteristic of softening while remaining amorphous in a given temperature range [Tx–Tg] inherent to each alloy (where Tx: crystallisation temperature and Tg: glass transition temperature). It is therefore possible to shape them under a relatively low stress at a moderate temperature. This then allows fine geometries to be reproduced very precisely, since the viscosity of the alloy decreases severely and this alloy thus moulds to all the details of the mould.

In addition, the invention also relates to a watch characterised in that it comprises a pressure sensor having a membrane that is consistent with the above explanation. An advantageous embodiment of this watch is the subject of dependent claim 10.

BRIEF DESCRIPTION OF THE FIGURES

The purposes, advantages and features of the watch according to the present invention will be made clearer in the following detailed description of at least one embodiment of the invention given solely by way of non-restrictive example and illustrated by the attached drawings:

FIG. 1 is a schematic sectional view of a watch comprising a membrane according to the present invention;

FIG. 2 is a schematic sectional view of a watch comprising the membrane according to the present invention when this is subjected to external pressure;

DETAILED DESCRIPTION

Figure 3:
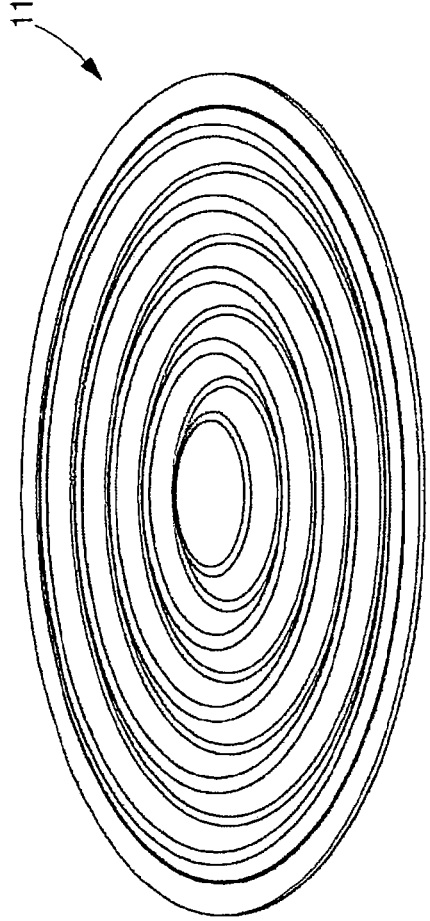
FIG. 3 is a schematic representation of a preferred embodiment of the membrane according to the present invention.

FIGS. 1 and 2 are sectional views of a dive watch 1 composed of a sub-structure 2, on which a bezel 3 bearing a glass 4 of the watch 1 is secured. A display unit 5 also secured to the sub-structure 2 is arranged under the glass 4.

The watch 1 is closed by a base 7 that is tightly secured to an intermediate section 8 that is itself tightly secured to the sub-structure 2, thus forming a case. The watch also comprises a pressure sensor 6 that is preferably located inside this case 21.

The pressure sensor 6 comprises a transmission device 10 as well as a membrane 11 that is mounted to form a sealed cavity 9. The membrane 11 is located inside the case 21 of the watch 1 and secured onto a support 12 at its periphery. This allows a favourable deformation of the membrane 11 to be assured. In our example, the support 12 is secured to the intermediate part 8. To ensure that the membrane 11 is in contact with the outside environment, the base 7 of the case 21 is pierced by several orifices 13. These orifices 13 allow the membrane to deform if the pressure is different on either side of the membrane 11, as shown in FIG. 2.

Moreover, it can be provided that the base 7 of the case 21 is fitted with a removable cover 14 that can be secured by clipping in place in order to block the orifices 13 when a pressure measurement is not required. This provides protection for the pressure sensor 6.

For operation of the pressure sensor 6, the transmission device 10 is used in conjunction with said membrane 11. Thus, under the effect of the pressure difference between the sealed cavity 9 and the outside environment, the membrane 11 will deform to a greater or lesser extent. In fact, if the external pressure is greater than the pressure inside the sealed cavity 9, then the membrane 11 will deform in order to constrict the volume of the sealed cavity 9, as may be seen in FIG. 2.

This deformation of the membrane 11 will act on the transmission device 10, which will detect the position of the membrane 11 in relation to its initial position. The initial position is preferably that in which the pressures on either side of the membrane 11 are equal. Once the detection has occurred, the transmission device 10 will transmit this deformation of the membrane 11 by a mechanical movement, for example.

This movement representing the pressure transmitted by the device 10 can then possibly be amplified, then used by the display device 5. This latter device will use a means for converting this movement representing the deformation, and therefore the pressure, into a depth value. This device 5 will then display the depth measured by the pressure sensor 6. It can, of course, be provided that the pressure is detected by any other means such as a piezoelectric transducer. Moreover, other functions that make use of this pressure such as an altimeter or weather forecasting function are possible.

The elements of the sensor 6 are therefore calibrated using predetermined load specifications defining the desired range of measurement for the displacement of the membrane 11. The desired range of measurement represents the maximum pressure value that one wishes to detect and display, e.g. a depth of 100 metres. The displacement of the membrane 11 defines the maximum deformation that said membrane 11 can make. Thus, the characteristics of the membrane 11 are then defined on the basis of these two values. Said membrane is characterised by its dimensions (diameter and thickness in the case of a circular membrane 11 of the present example) and by the material it is made of.

Advantageously, according to the invention the membrane 11 consists of an amorphous or partially amorphous material. In particular, metallic glasses, i.e. amorphous metal alloys, are used to form the membrane 11.

Figure 5:
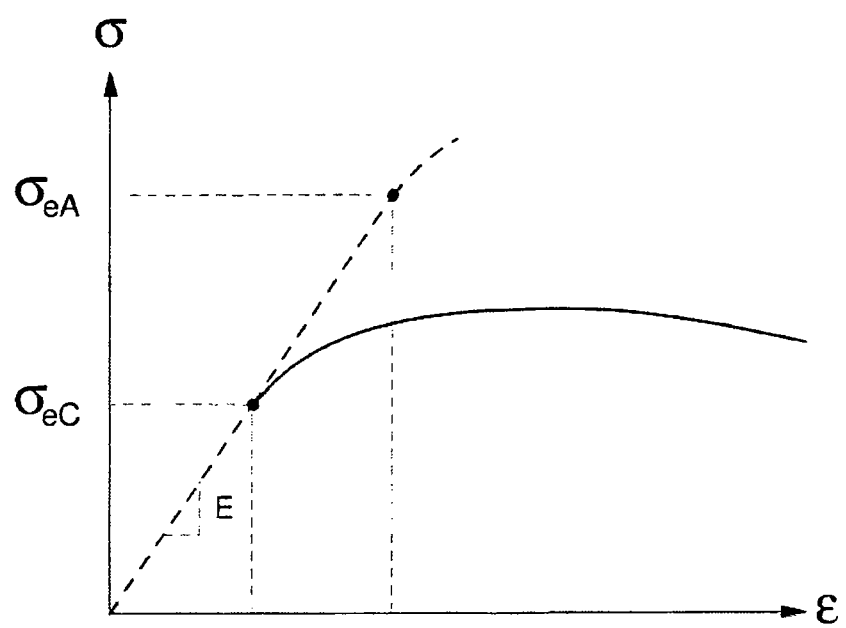
FIG. 5 shows deformation curves for a crystalline material and for an amorphous material.

In fact, the advantage in terms of deformation of these amorphous metal alloys comes from the fact that during their production, the atoms forming this amorphous material are not arranged in any particular structure, as is the case with crystalline materials. Therefore, even if the Young's modulus of a crystalline material and an amorphous material is identical, the elastic limit, $\sigma_e$, is different. In fact, the amorphous material is distinguished by a higher elastic limit or $\sigma_{ea}$ than that of the crystalline material with a ratio essentially equal to two, as shown in FIG. 5. This figure shows the curve of the stress $\sigma$ as a function of the deformation a for an amorphous material (in dotted lines) and for a crystalline material. This means that amorphous materials can be subjected to a higher stress before reaching the elastic limit $\sigma_e$.

Firstly, this membrane 11 made of amorphous material thus allows the reliability of the pressure sensor 6 to be improved compared to a membrane 11 made of crystalline material. In fact, the elastic limit $\sigma_{ea}$ is higher and this means the plastic region is further away, thus reducing the risk of plastic deformation of the membrane.

Moreover, this ability to elastically withstand a higher stress allows a larger range of measurement to be conceivable.

Moreover, advantageously, it is found that in the case of a membrane 11 made of amorphous material its dimensions can also be optimised when the same stress is applied centrally in order to cover an equivalent displacement. In fact, the dimensions of the membrane 11 modify its deformation. Thus, if the diameter increases, then the theoretical displacement of the membrane increases. Moreover, if the thickness increases, the theoretical displacement of the membrane 11 decreases. Advantageously, in the case of an elastic limit that increases, the stress that can be applied to the membrane 11 without plastic deformation also increases. It thus becomes possible to retain the same movement amplitude by reducing its diameter and its thickness.

With respect to the material itself, it can firstly be noted that the higher the $\sigma_e/E$ ratio, the more effective the sensor. Advantageously, the materials in which the $\sigma_e/E$ ratio is higher than 0.01 are the most appropriate materials for the formation of a pressure sensor membrane 11. It can also be specified that apart from the $\sigma_e/E$ ratio, the value of E can also be selected to be higher than a certain limit so that the pressure sensor can be contained in an acceptable space. This limit is preferably set at 50 GPa.

A certain number of characteristics can then be taken into account. Thus, it can be considered that the characteristics of corrosion resistance and non-magnetic characteristics are particularly relevant for a dive watch.

Hence, examples of amorphous materials that can be used can be cited. Therefore, by way of example, Zr41Ti14Cu12Ni10Be23, for which the Young's modulus E amounts to 105 GPa and the elastic limit amounts to $\sigma_e$=1.9 GPa, has a $\sigma_e/E$ ratio=0.018, and Pt57.5Cu14.7Ni5.3P22.3, for which the Young's modulus E amounts to 98 GPa and the elastic limit amounts to $\sigma_e$=1.4 GPa, has a $\sigma_e/E$ ratio=0.014.

Naturally, there are other characteristics that can be of interest, such as the allergenic status of the alloy. In fact, it may be noted that the materials, whether crystalline or amorphous, often use alloys comprising allergenic elements. For example, such types of alloys comprise cobalt, beryllium or nickel. Therefore, variants of the membrane 11 according to the invention can be formed using alloys that do not contain these allergenic elements. It can also be provided that allergenic elements are present, but these do not cause any allergenic reaction. For this, it can be provided that the membrane 11 that contains these allergenic elements does not release them when corrosion attacks the membrane 11.

According to another variant of the invention, it can be provided that the membrane 11 is made of noble material. In fact, in crystalline state, noble materials such as gold or platinum are too soft to allow the formation of a flexible and strong membrane 11. However, when they are present in metallic glass form, i.e. in amorphous state, these precious metals then have characteristics that enable them to be used to produce a membrane 11 for a pressure sensor, while also allowing a luxurious and aesthetically pleasing appearance. Platinum 850 (Pt 850) and gold 750 (Au 750) are the preferred precious metals to be used for the production of said membrane 11. Naturally, other precious metals could also be used such as palladium, rhenium, ruthenium, rhodium, silver, iridium and osmium.

It can also be noted that amorphous metal alloys are readily shaped. In fact, amorphous metals have the particular characteristic of softening while remaining amorphous in a given temperature range (Tx−Tg) inherent to each alloy. It is therefore possible to shape them under a relatively low stress and at a temperature that is not too high.

This process consists of hot forming an amorphous preform. This preform is obtained by melting metal elements forming the amorphous alloy in an oven. This melting is controlled so that any contamination of the alloy with oxygen is as low as possible. Once these elements are melted, they are cast in semi-finished form, e.g. as a disc with dimensions close to the membrane 11, then cooled rapidly to retain the amorphous state. Once the preform is made, hot forming is conducted in order to obtain the finished part. This hot forming is conducted by pressing in a temperature range between Tg and Tx for a determined time to retain a totally or partially amorphous structure. This is done in order to retain the characteristic elastic properties of the amorphous metals. The different steps of the final shaping of the membrane 11 are therefore:
 a) heating matrixes that have the negative form of the membrane 11 to a selected temperature,
 b) inserting an amorphous metal disc between the hot matrixes,
 c) applying a closing force to the matrixes in order to replicate the geometry of these on the amorphous metal disc,
 d) waiting for a selected maximum period,
 e) opening the matrixes,
 f) rapidly cooling the membrane 11 below Tg, and
 g) removing the membrane 11 from the matrixes.

This method of forming enables fine geometries to be reproduced with high precision, since the viscosity of the alloy decreases severely, and this can then mould to all the details of the mould. The advantage of this method is that there is no hardening shrinkage, and this permits a more precise part to be formed at a lower temperature than by injection moulding.

Naturally, other types of shaping process are possible such as injection moulding. This process consists of moulding the alloy obtained by melting metal elements in an oven into any shape whatever, such as a bar, in either a crystalline or an amorphous state. This alloy part of whatever shape is melted again to be injected into a mould that has the shape of the final part. Once the mould is full, it is cooled rapidly to a temperature below Tg in order to avoid crystallisation of the alloy and thus obtain a membrane 11 made of amorphous or semi-amorphous metal.

Figure 4:
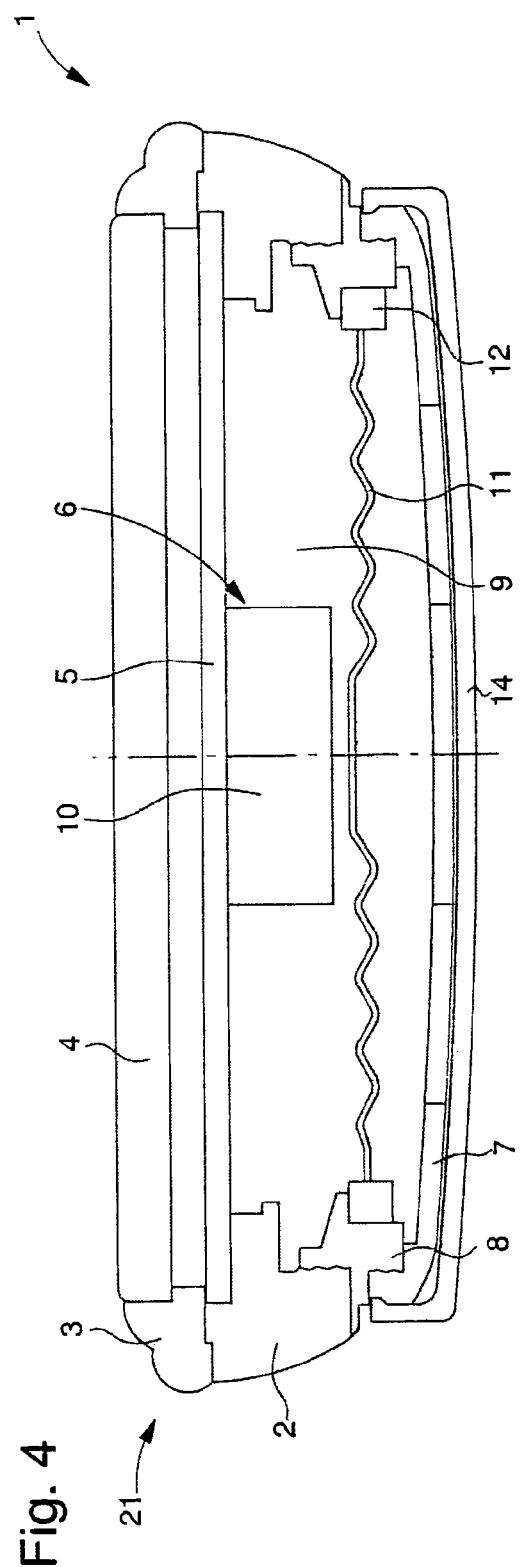
FIG. 4 shows a watch comprising the membrane according to said preferred embodiment.

Thus, it is possible to shape the membrane 11 according to the desired geometry. For example, it is possible to shape the profile of the membrane 11 in order to modify its properties in the same way as its thickness and its diameter. By way of example, it is possible to mould the membrane 11 in order to obtain a sinusoidal profile, as shown in FIGS. 3 and 4. Such a shape enables the surface of the membrane 11 to be increased as well as its rigidity. The membrane 11 is therefore harder to deform. This configuration of the section advantageously also allows the elastic deformation of the material to be linearised as a function of the pressure. This linearisation thus assists in simplifying the means of converting the deformation of the membrane 11 to a pressure value.

It must be understood that various modifications and/or improvements and/or combinations obvious to the skilled person can be applied to the different embodiments of the invention discussed above without departing from the invention as defined by the attached claims. For example, the membrane has a different shape.

The invention claimed is:

1. A pressure sensor comprising a flexible membrane cooperating with a transmission device that enables a value representing the pressure to be supplied on the basis of the deformation of the membrane, wherein the membrane is made from an at least partially amorphous metal alloy in order to optimise the dimensions of the sensor, and wherein the at least partially amorphous metal alloy comprises at least one precious type element included in the list comprising gold, platinum, palladium, rhenium, ruthenium, rhodium, silver, iridium or osmium.

2. The pressure sensor according to claim 1, wherein the membrane is made of a completely amorphous material.

3. The pressure sensor according to claim 2, wherein the material has a ratio of elastic limit to its Young's modulus of more than 0.01.

4. A watch, wherein it comprises a pressure sensor according to claim 2.

5. The pressure sensor according to claim 1, wherein the material has a ratio of elastic limit to its Young's modulus of more than 0.01.

6. The pressure sensor according to claim 5, wherein the material has a Young's modulus of more than 50 GPa.

7. A watch, wherein it comprises a pressure sensor according to claim 6.

8. A watch, wherein it comprises a pressure sensor according to claim 5.

9. The pressure sensor according to claim 1, wherein the membrane is substantially discoidal and is secured to the sensor by its periphery.

10. A watch, wherein it comprises a pressure sensor according to claim 9.

11. The pressure sensor according to claim 1, wherein the membrane has a non-rectilinear profile in order to increase its deformation surface.

12. A watch, wherein it comprises a pressure sensor according to claim 11.

13. The pressure sensor according to claim 11, wherein the profile of the membrane has at least one sinusoidal portion.

14. A watch, wherein it comprises a pressure sensor according to claim 13.

15. A watch, wherein it comprises a pressure sensor that includes a flexible membrane cooperating with a transmission device that enables a value representing the pressure to be supplied on the basis of the deformation of the membrane, wherein the membrane is made from an at least partially amorphous metal alloy in order to optimise the dimensions of the sensor, wherein the at least partially amorphous metal alloy comprises at least one precious type element included in the list comprising gold, platinum, palladium, rhenium, ruthenium, rhodium, silver, iridium or osmium.

16. The watch according to claim 15, wherein it additionally comprises a means for converting the value representing the pressure into a depth value to allow the watch to perform a depth gauge function.

\* \* \* \* \*